(12) United States Patent
Lee

(10) Patent No.: US 7,257,827 B2
(45) Date of Patent: Aug. 14, 2007

(54) OPTICAL DISK DRIVE ASSEMBLY THAT IS ROTATABLE WITH RESPECT TO A COMPUTER CASING

(75) Inventor: Seung-woon Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 446 days.

(21) Appl. No.: 10/834,164

(22) Filed: Apr. 29, 2004

(65) Prior Publication Data

US 2005/0097580 A1    May 5, 2005

(30) Foreign Application Priority Data

Sep. 29, 2003   (KR) ............... 10-2003-0067464

(51) Int. Cl.
*G11B 33/12*    (2006.01)
*H05K 5/02*    (2006.01)
*H05K 7/16*    (2006.01)
*A47B 81/00*    (2006.01)

(52) U.S. Cl. ............ 720/653; 720/657; 312/223.2; 361/685; 361/725

(58) Field of Classification Search ........ 720/600, 720/647, 652, 653, 657; 361/684, 685, 724, 361/725, 726; 312/223.2
See application file for complete search history.

(56) References Cited

U.S. PATENT DOCUMENTS

| | | | | |
|---|---|---|---|---|
| 5,572,402 A * | 11/1996 | Jeong | ............... | 361/685 |
| 5,822,184 A | 10/1998 | Rabinovitz | ............... | 361/685 |
| 6,227,632 B1 * | 5/2001 | Liu | ............... | 312/223.2 |
| 6,262,888 B1 * | 7/2001 | Siedow et al. | ............... | 361/685 |
| 6,507,487 B1 * | 1/2003 | Barina et al. | ............... | 361/685 |
| 6,580,603 B1 * | 6/2003 | Resnick | ............... | 361/683 |
| 6,700,776 B2 * | 3/2004 | Bang et al. | ............... | 361/683 |
| 6,711,002 B1 * | 3/2004 | Fan | ............... | 361/679 |
| 6,714,409 B2 * | 3/2004 | Chen | ............... | 361/685 |
| 6,882,527 B2 * | 4/2005 | Wang et al. | ............... | 361/685 |
| 6,922,336 B2 * | 7/2005 | Barsun et al. | ............... | 361/683 |
| 6,956,737 B2 * | 10/2005 | Chen et al. | ............... | 361/685 |
| 7,042,721 B2 * | 5/2006 | Olesiewicz et al. | ............... | 361/695 |
| 2002/0172003 A1 * | 11/2002 | Bang et al. | ............... | 361/683 |
| 2004/0075979 A1 * | 4/2004 | Wang et al. | ............... | 361/685 |
| 2004/0190235 A1 * | 9/2004 | Chou | ............... | 361/683 |

FOREIGN PATENT DOCUMENTS

| JP | 2000082884 A | * | 3/2000 |
|---|---|---|---|
| KR | 20-179366 | | 2/2000 |
| KR | 2001-54973 | | 7/2001 |

* cited by examiner

*Primary Examiner*—William J Klimowicz
(74) *Attorney, Agent, or Firm*—Roylance, Abrams, Berdo & Goodman, L.L.P.

(57) ABSTRACT

A computer comprising: a main body casing accommodating a plurality of hardware components and comprising an entrance opening on a first side thereof; an optical disk drive assembly combined to the main body casing to rotate relative to the main body casing; and a hinge unit provided on a side of the entrance opening of the main body casing, and supporting the optical disk drive assembly to enable the optical disk drive assembly to rotate between an accommodated position where the optical disk drive assembly is accommodated in the main body casing and an ejected position where the optical disk drive assembly is ejected out of the main body casing through the entrance opening. Such a computer is easy for disassembling and assembling when the user repairs or upgrades because an optical disk drive assembly rotates between the accommodated position and the ejected position.

10 Claims, 7 Drawing Sheets

OPTICAL DISK DRIVE ASSEMBLY THAT IS ROTATABLE WITH RESPECT TO A COMPUTER CASING

CROSS-REFERENCE TO RELATED APPLICATIONS

This application claims the benefit of Korean Patent Application No. 2003-067464, filed Sep. 29, 2003, in the Korean Intellectual Property Office, the disclosure of which is hereby incorporated herein by reference.

BACKGROUND OF THE INVENTION

1. Field of the Invention

The present invention relates to a computer, and particularly to a computer comprising a rotatable optical disk drive assembly.

2. Description of the Related Art

As illustrated in FIG. 7, a computer generally comprises a casing 110, a peripheral device 121 provided in the casing 110, a computer main body 101 comprising a plurality of hardware components such as a main board installed with a central processing unit (CPU), a random access memory (RAM), and an extension card such as a graphic card or a sound card, and a monitor (not shown) receiving a video signal from the computer main body 101 and displaying a picture.

The casing 110 comprises a front panel 120 formed with a peripheral device insertion hole 125 into which the peripheral device 121 such as a floppy disk drive and/or a compact disk read-only-memory (CD-ROM) drive is inserted, a rear panel 140 formed with a plurality of connector insertion holes 141 to connect an externally-installed device, a support panel 130 provided between the front panel 120 and the rear panel 140 and connected to the front panel 120 and to the rear panel 140 and supporting a bottom surface, and a frame 150 positioned on a top of the front panel 120 and the rear panel 140 and forming an accommodating space inside.

A front surface of the front panel 120 is provided with a power switch (not shown) for applying power to the computer system and a reset switch, while a rear surface of the front panel 120 is coupled to a combining bracket 160 supporting the peripheral device 121.

As illustrated in FIG. 7, the combining bracket 160 is made of metallic material and shaped like a box. A front end of the combining bracket 160 is positioned on the front surface of the front panel 120 while a rear end of the combining bracket 160 is positioned at a middle area of the support panel 130. Also, since the side walls of the combining bracket 160 are provided with a plurality of through holes 162 corresponding to combining holes 123 of the peripheral device 121 inserted into the combining bracket 160, the peripheral device 121 can be coupled to the combining bracket 160. Accordingly, peripheral devices 121 such as a CD-ROM, a DVD player, a floppy disk drive, and a hard disk drive are selectively installed inside the combining bracket 160 along a vertical direction.

With such a configuration, the peripheral device 121 inserted into the combining bracket 160 is coupled to the combining bracket 160 by a bolt 127 passing through the through hole 162 and the combining hole 123.

As described above, in a conventional computer, when replacing a component installed inside the casing 110 such as a component on a main board for the purpose of upgrading or repairing, a user needs to disassemble the combination of a bolt combining the peripheral device 121 and the casing 110 with a tool such as a screw driver to separate the peripheral device 121 from the casing 110 completely to repair or replace the component. This process is both time-consuming and inconvenient.

A need therefore exists for a peripheral device that is installed rotatably relative to a casing such that it will not be required to disassemble the combination of the bolt to separate the peripheral device from the casing completely. If a peripheral device is installed in such a manner, repairing and disassembling of the component within a spacious inner space of the casing will be enhanced because the peripheral device accommodated in the casing may be rotated to be positioned at the outside of the casing. By installing the peripheral device rotatably, it is convenient for a user to replace a component because of malfunction or for upgrading purposes

SUMMARY OF THE INVENTION

Accordingly, it is an aspect of the present invention to provide a computer having a rotatable optical disk drive assembly.

The foregoing and other aspects of the present invention are achieved by providing a computer comprising: a main body casing accommodating a plurality of hardware components and comprising an entrance opening on a first side thereof; an optical disk drive assembly coupled to the main body casing to rotate relative to the main body casing; and a hinge unit provided on a side of the entrance opening of the main body casing, and supporting the optical disk drive assembly to enable the optical disk drive assembly to rotate between an accommodated position where the optical disk drive assembly is accommodated in the main body casing and an ejected position where the optical disk drive assembly is ejected out of the main body casing through the entrance opening.

According to an aspect of the invention, the hinge unit comprises first and second hinges being spaced from each other with a predetermined distance along a longitudinal direction on a side of the entrance opening.

According to an aspect of the invention, the computer further comprises a lock locking or unlocking the optical disk drive assembly relative to the main body casing in the accommodated position.

According to an aspect of the invention, the computer further comprises a damper decreasing a rotation speed of the optical disk drive assembly when the optical disk drive assembly rotates from the ejected position to the accommodated position.

According to an aspect of the invention, the lock comprises: a locking holder provided on one of the main body casing and the optical disk drive assembly; and a latch member provided on the other one of the main body casing and the optical disk drive assembly, and comprising a locking part capable of engaging with the locking holder, and rotating between a locking position where the locking part stops rotation of the optical disk drive assembly by being engaged with the locking holder and an unlocking position where the rotation of the optical disk drive assembly is allowed as the locking part is disengaged from the locking holder.

According to an aspect of the invention, the damper comprises: a damper member provided on one of the optical disk drive assembly and the main body casing, and comprising a damper locking part; and a damper member guide provided on the other one of the optical disk drive assembly and the main body casing, and guiding the damper member with a curved part on which the damper locking part moves slidingly as the optical disk drive assembly rotates from the ejected position to the accommodated position.

According to an aspect of the invention, the optical disk drive assembly comprises: an optical disk drive main body being capable of accommodating the optical disk; and a supporting bracket supporting the optical disk drive main body.

According to an aspect of the invention, the first hinge comprises: a hinge protrusion formed on a bottom surface of the supporting bracket; and a pair of main body hinge holes provided on the side of the entrance opening of the main body casing, and rotatably accommodating the hinge protrusion.

According to an aspect of the invention, the second hinge comprises: a hinge bracket connecting the main body casing and the supporting bracket; a hinge pin hole formed through the hinge bracket and the supporting bracket; and a hinge pin rotatably accommodated into the hinge pin hole.

According to an aspect of the invention, the latch member is installed on a side of the supporting bracket; and wherein the locking holder comprises a locking groove formed through the latch locking part installed on a side of the main body casing opposite to the entrance opening.

According to an aspect of the invention, the latch member further comprises a latch hinge supporting the latch member to enable the latch member to rotate between the locking position and the unlocking position; and wherein the latch hinge comprises a shaft accommodating hole formed through the latch member and the supporting bracket, a shaft rotatably accommodated into the shaft accommodating hole, and a spring member combined to the shaft.

According to an aspect of the invention, the damper member is installed on the bottom surface of the supporting bracket; and wherein the damper member guide is installed on the side of the main body casing opposite to the entrance opening.

According to an aspect of the invention, the computer further comprises a lock for locking or unlocking the optical disk drive assembly relative to the main body casing in the accommodated position.

According to an aspect of the invention, the lock comprises: a locking holder provided on one of the main body casing and the optical disk drive assembly; and a latch member provided on the other one of the main body casing and the optical disk drive assembly, and comprising a locking part being capable of engaging with the locking holder, and allowing rotation of the optical disk drive assembly by releasing the locking part from the locking holder or from the locking position where the locking part is engaged with the locking holder to stop the rotation of the optical disk drive assembly.

According to an aspect of the invention, the computer further comprises a damper decreasing a rotation speed of the optical disk drive assembly as the optical disk drive assembly rotates from the ejected position to the accommodated position.

According to an aspect of the invention, the damper comprises: a damper member provided on one of the optical disk drive assembly and the main body casing, and comprising a damper locking part; and a damper member guide provided on the other one of the optical disk drive assembly and the main body casing, and guiding the damper member with a curved part on which the damper locking part can move slidingly as the optical disk drive assembly rotates from the ejected position to the accommodated position.

BRIEF DESCRIPTION OF THE DRAWINGS

The above and/or other aspects and advantages of the present invention will become apparent and more readily appreciated from the following description of the embodiments, taken in conjunction with the accompanying drawings of which.

DETAILED DESCRIPTION OF THE PREFERRED EMBODIMENTS

Figure 1:
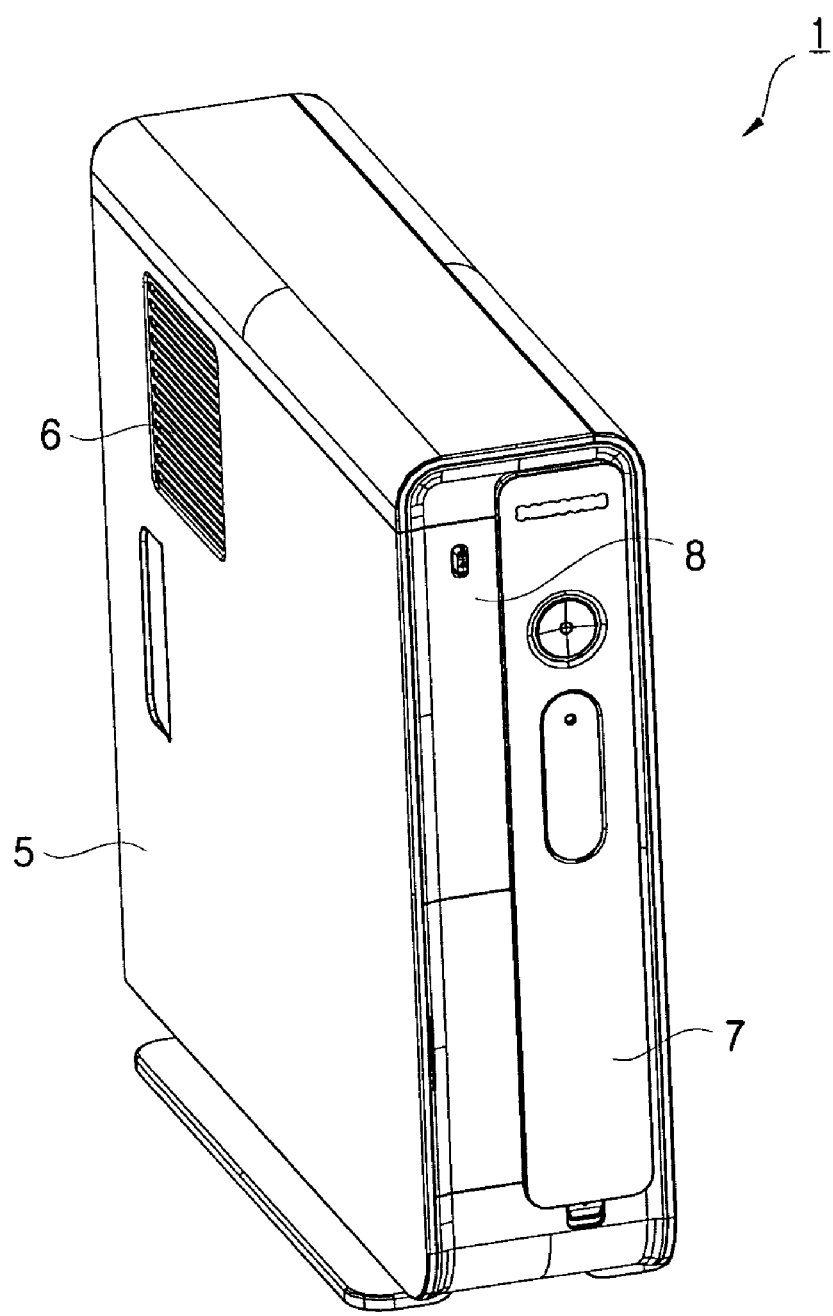
FIG. 1 is a perspective view of a computer according to an embodiment of the present invention.

Reference will now be made in detail to the embodiments of the present invention, examples of which are illustrated in the accompanying drawings, wherein like reference numerals refer to like elements throughout. The embodiments are described below to explain the present invention by referring to the figures.

Figure 2:
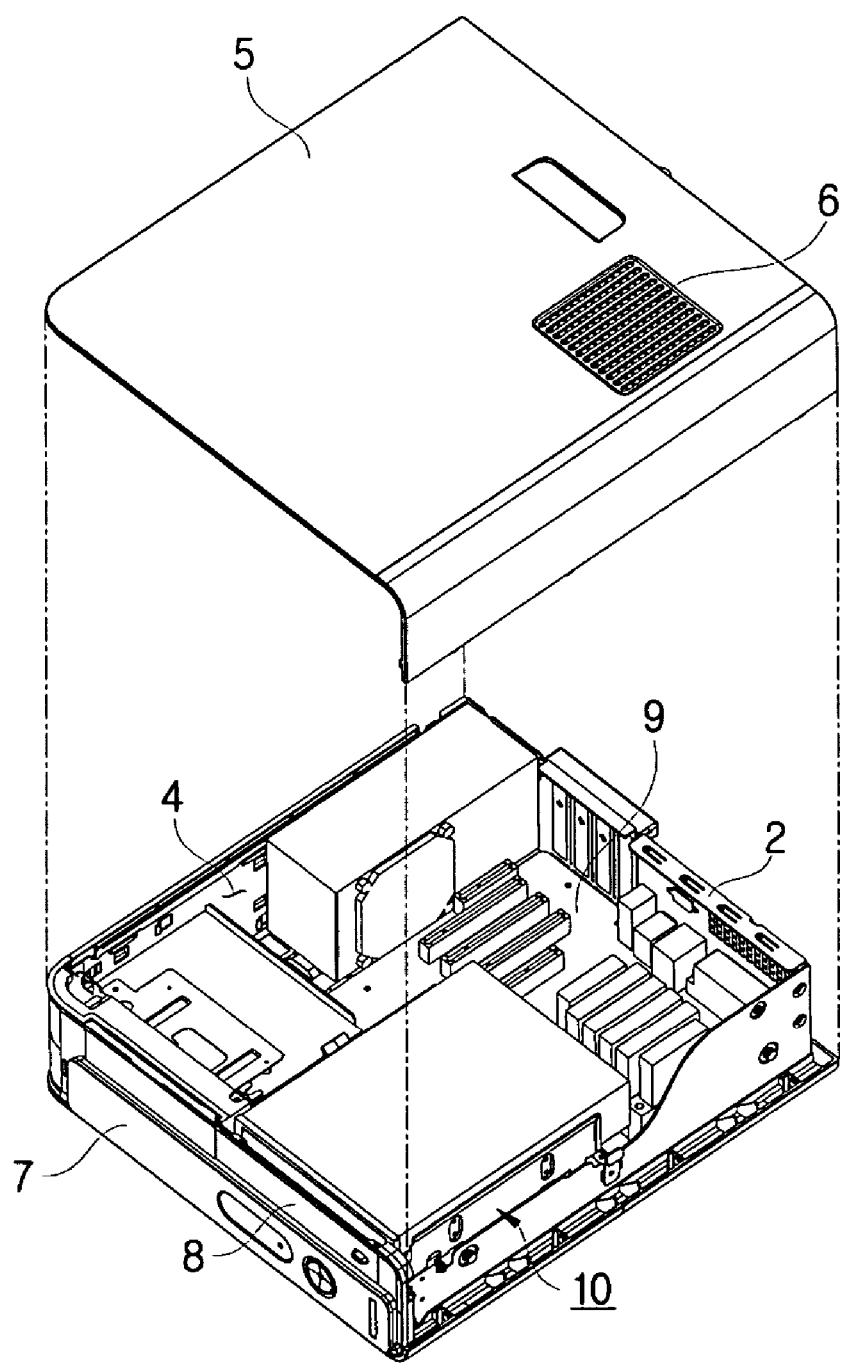
FIG. 2 is a perspective view illustrating an optical disk drive according to FIG. 1 in an accommodated position.
Figure 3:
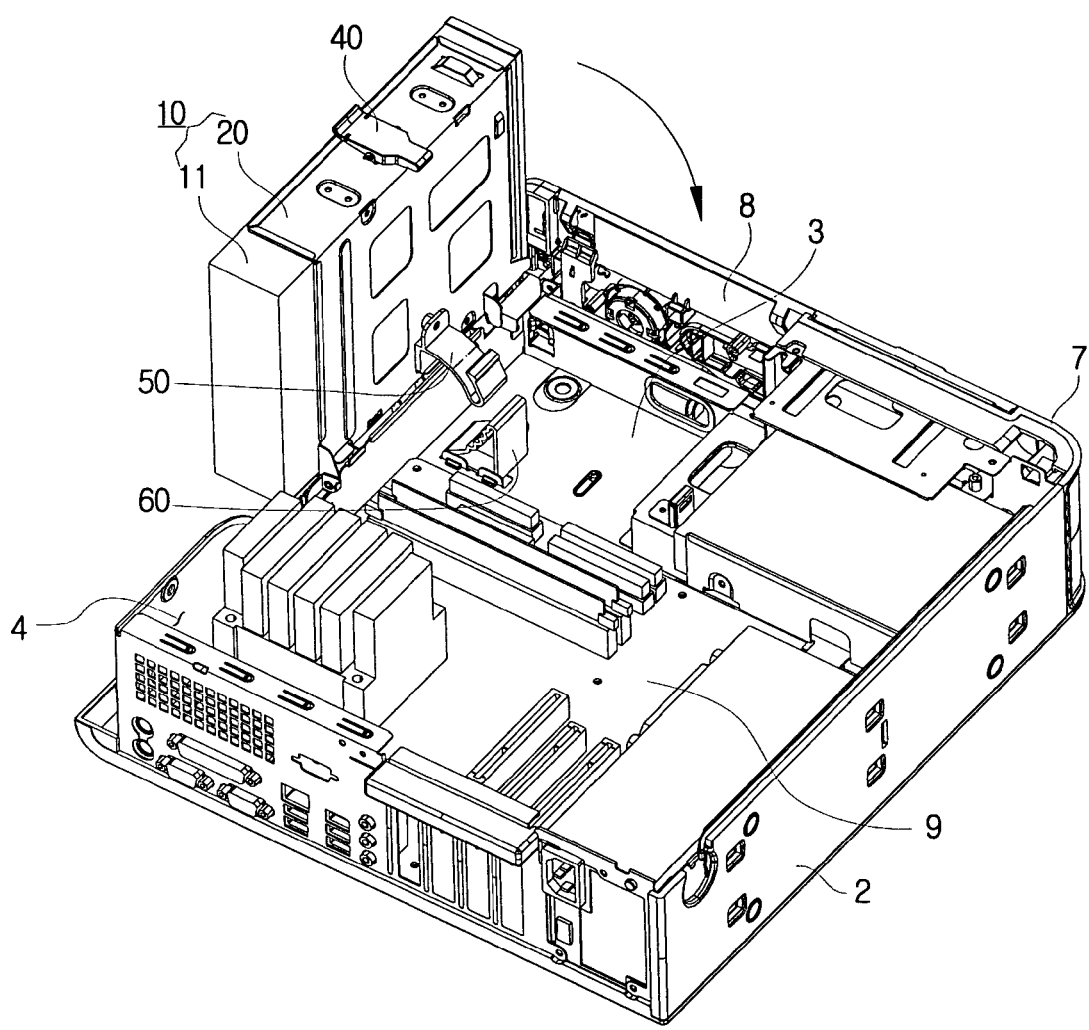
FIG. 3 is a perspective view illustrating an optical disk drive according to FIG. 2 in an ejected position.
Figure 4:
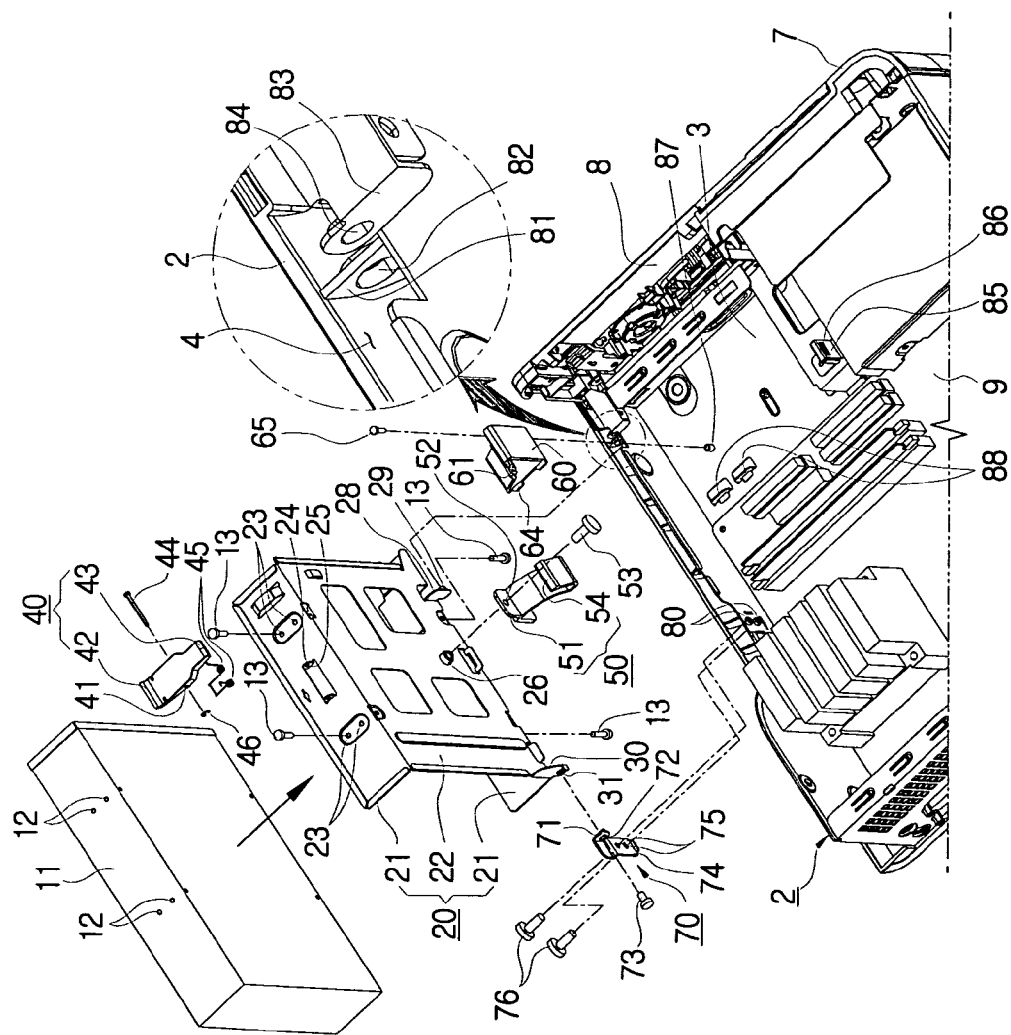
FIG. 4 is an exploded perspective view of an optical disk drive according to FIG. 3.

FIG. 1 is a perspective view of a computer according to an embodiment of the present invention, and FIG. 2 is a perspective view illustrating an optical disk drive according to FIG. 1 in an accommodated position. FIG. 3 is a perspective view illustrating an optical disk drive according to FIG. 2 in an ejected position. FIG. 4 is an exploded perspective view of the optical disk drive according to FIG. 3;

With reference to FIGS. 1-4, a computer according to an embodiment of the present invention comprises a computer main body 1, a monitor (not shown) displaying a picture on a screen, and an input apparatus (not shown) such as a mouse or a keyboard with which a user can input a predetermined signal through the monitor.

The computer main body 1 comprises a main body casing 2 forming an exterior, a side casing 5 configured to removably open/close an entrance opening 4 formed on a side of the main body casing 2, and a front casing 7 provided on a front of the main body casing 2.

The main body casing 2 comprises a main board 9 installed on a main body side plate 3 positioned in parallel with the side casing 5 and installed with a CPU, a RAM, and an extension card such as a graphic card or a sound card, and various components such as an optical disk drive assembly 10.

The optical disk drive assembly 10 comprises an optical disk drive main body 11 accommodating an optical disk, and a supporting bracket 20 supporting the optical disk drive main body 11.

The optical disk drive assembly 10 is combined to the main body casing 2 by a hinge to be rotated relative to the main body casing 2. Accordingly, the optical disk drive assembly 10 can rotate to shift between the accommodated position (FIG. 2) where the optical disk drive assembly 10 is accommodated in an inner space of the main body casing 2 and the ejected position (FIG. 3) where the optical disk drive assembly 10 is ejected from the inner space of the main body casing 2 and positioned at the outside of the main body casing 2.

An optical disk drive main body 11 can be a CD-ROM drive, a Compact Disk-Rewritable (CD-RW) drive, or a Digital Video Disk (DVD) drive, and opposite sides of the optical disk drive main body 11 are formed with a plurality of first installing holes 12 that cooperate with holes in the supporting bracket 20.

The supporting bracket 20 is shaped like a box having openings on a top, on a front and on a rear, respectively, to accommodate the optical disk drive main body 11. Herein, the supporting bracket 20 comprising a pair of bracket sides 21, a bracket bottom surface 22 provided between the pair of the bracket sides 21 functions to support the optical disk drive main body 11.

The pair of the bracket sides 21 of the supporting bracket 20 are formed with second installing holes 23 being positioned on a same axis line as respective ones of the first installing holes 12 of the optical disk drive main body 11. Accordingly, the optical disk drive accommodated in the supporting bracket 20 can be affixed to the supporting bracket 20 with a screw 13 inserted into at least one of the first installing hole 12 and the corresponding second installing hole 23.

The side casing 5 is formed with a plurality of air through holes 6 to radiate heat generated from various components installed inside the main body casing 2.

A cover member 8 is installed on the front casing 7 to be aligned with the optical disk drive main body 11 in the accommodated position. A front surface of the optical disk drive main body 11 can be exposed to the outside, or covered to be hidden by the cover member 8 according to rotation of the cover member 8.

Meanwhile, the computer according to an embodiment of the present invention further comprises a hinge supporting the optical disk drive assembly 10 to be rotating relative to the main body casing 2, a lock for locking/unlocking the optical disk drive assembly 10 in the accommodated position relative to the main body casing 2, and a damper for preventing the main body casing 2 from being applied with impact caused by the optical disk drive assembly 10 rotating rapidly from the ejected position to the accommodated position.

The hinge is provided on a side of the entrance opening 4 of the main body casing 2. Herein, the hinge functions to support the optical disk drive assembly 10 to enable the optical disk drive assembly 10 to rotate between the accommodated position where the optical disk drive assembly 10 is accommodated in the main body casing 2 and the ejected position where the optical disk drive assembly 10 is ejected from the inside of the main body casing 2 through the entrance opening 4 to be positioned on the outside of the main body casing 2.

The hinge comprises first and second hinges being spaced from each other with a predetermined distance along a longitudinal direction on the side of the entrance opening 4 of the main body casing 2.

With reference to FIG. 4, the first hinge comprises a first bracket hinge installing part 28 cut from the bracket bottom surface 22 and bent downward, a hinge protrusion 29 protruding from a surface of the first bracket hinge installing part 28, first and second main body hinge installing parts 81 and 83 provided on the side of the entrance opening 4 of the main body casing 2 and protruding upward from the main body casing 2 and being spaced from each other with a predetermined distance, and first and second main body hinge holes 82 and 84 formed through the first and second main body hinge installing parts 81 and 83, respectively, and accommodating rotatably the hinge protrusion 29.

The second hinge comprises a second bracket hinge installing part 30 being spaced from the first bracket hinge installing part 28 and protruding from the bracket bottom surface 22 of the supporting bracket 20 and bent downward, a second bracket hinge pin hole 31 formed through a surface of the second bracket hinge installing part 30, a hinge bracket 70 formed with a hinge pin hole 72 positioned on a same axis line with the second bracket hinge pin hole 31 and connecting the main body casing 2 and the supporting bracket 20, and a hinge pin 73 accommodated rotatably into the second bracket hinge pin hole 31 and the hinge pin hole 72.

Herein, the hinge bracket 70 is provided between the supporting bracket 20 and the main body casing 2. With continued reference to FIG. 4, the hinge bracket 70 comprises a hinge bracket installing part 71 provided on a first side of the hinge bracket 70 and combined with the second bracket hinge installing part 30 by the hinge pin 73, and a combining part 74 provided on a second side of the hinge bracket 70 and combined with a main body combining hole 80 formed on the main body casing 2 by a second screw 76.

Herein, the main body combining holes 80 are provided on the side of the entrance opening 4 of the main body casing 2 and spaced from each other with a predetermined distance along a longitudinal direction. The combining part 74 is formed with combining holes 75 positioned on a same axis line with the main body combining hole 80 for coupling via respective ones of the second screw 76. It is to be understood that one or more than two of the main body combining holes 80 and the combining holes 75 can be used.

A lock prevents the optical disk drive assembly 10 from rotating toward the ejected position by locking the optical disk drive assembly 10 relative to the main body casing 2 in the accommodated position. Also, the lock allows the optical disk drive assembly 10 to rotate toward the ejected position by unlocking the optical disk drive assembly 10 relative to the main body casing 2 in the accommodated position.

Figure 5:
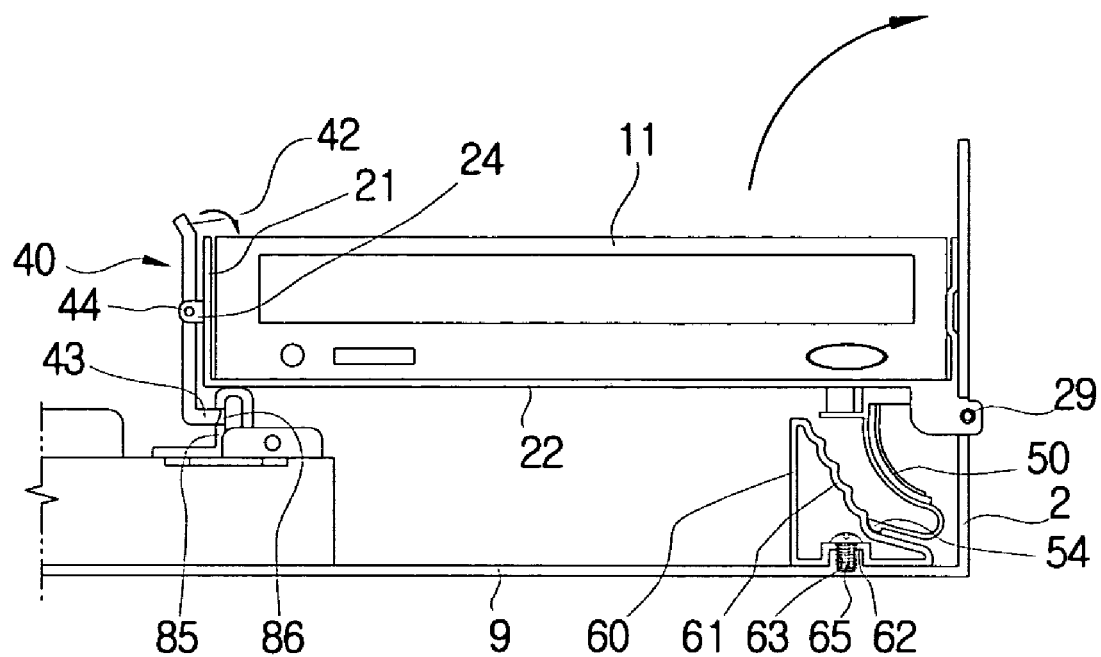
FIGS. 5 and 6 illustrate a rotating operation of the optical disk drive according to an embodiment of the present invention.
Figure 6:
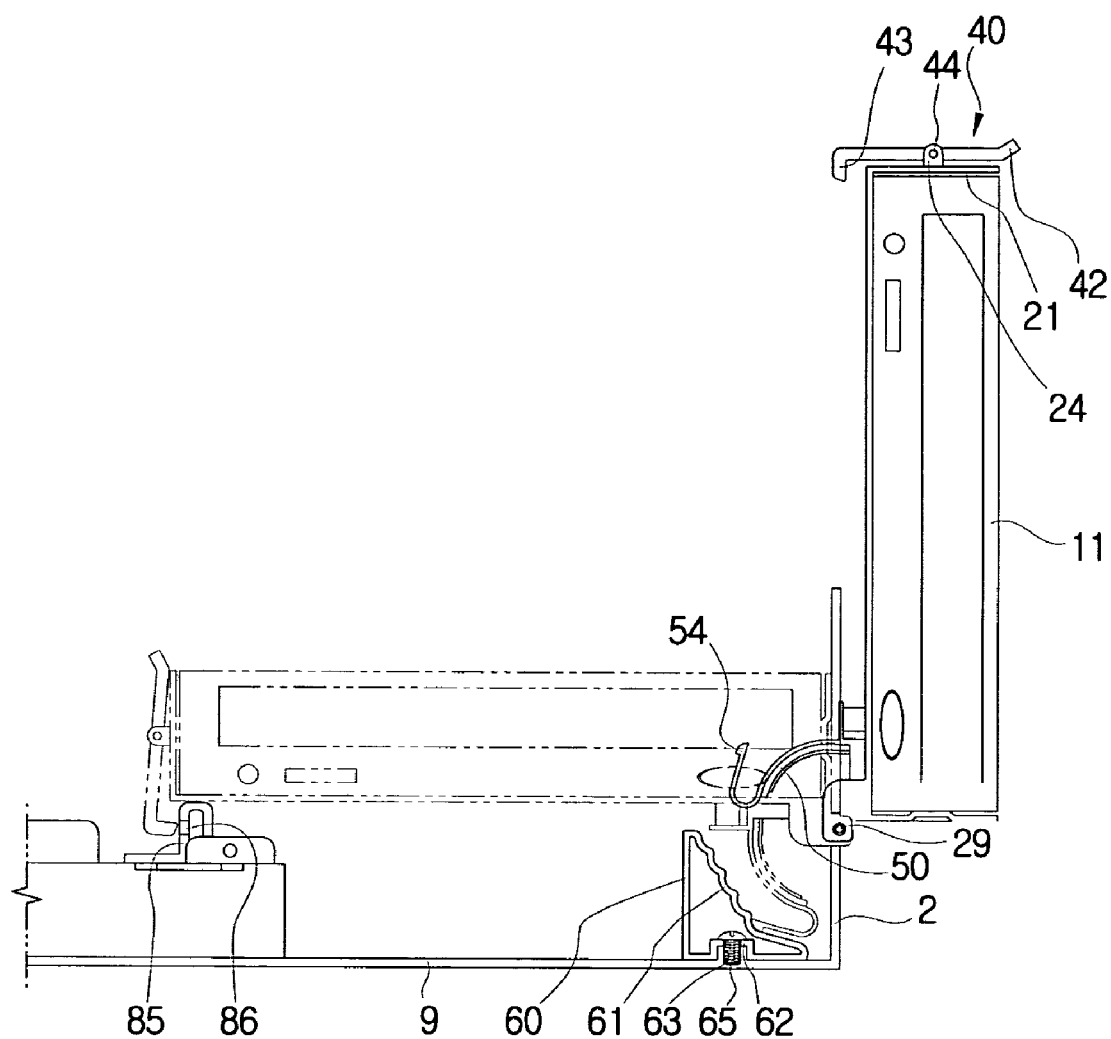
Figure 7:
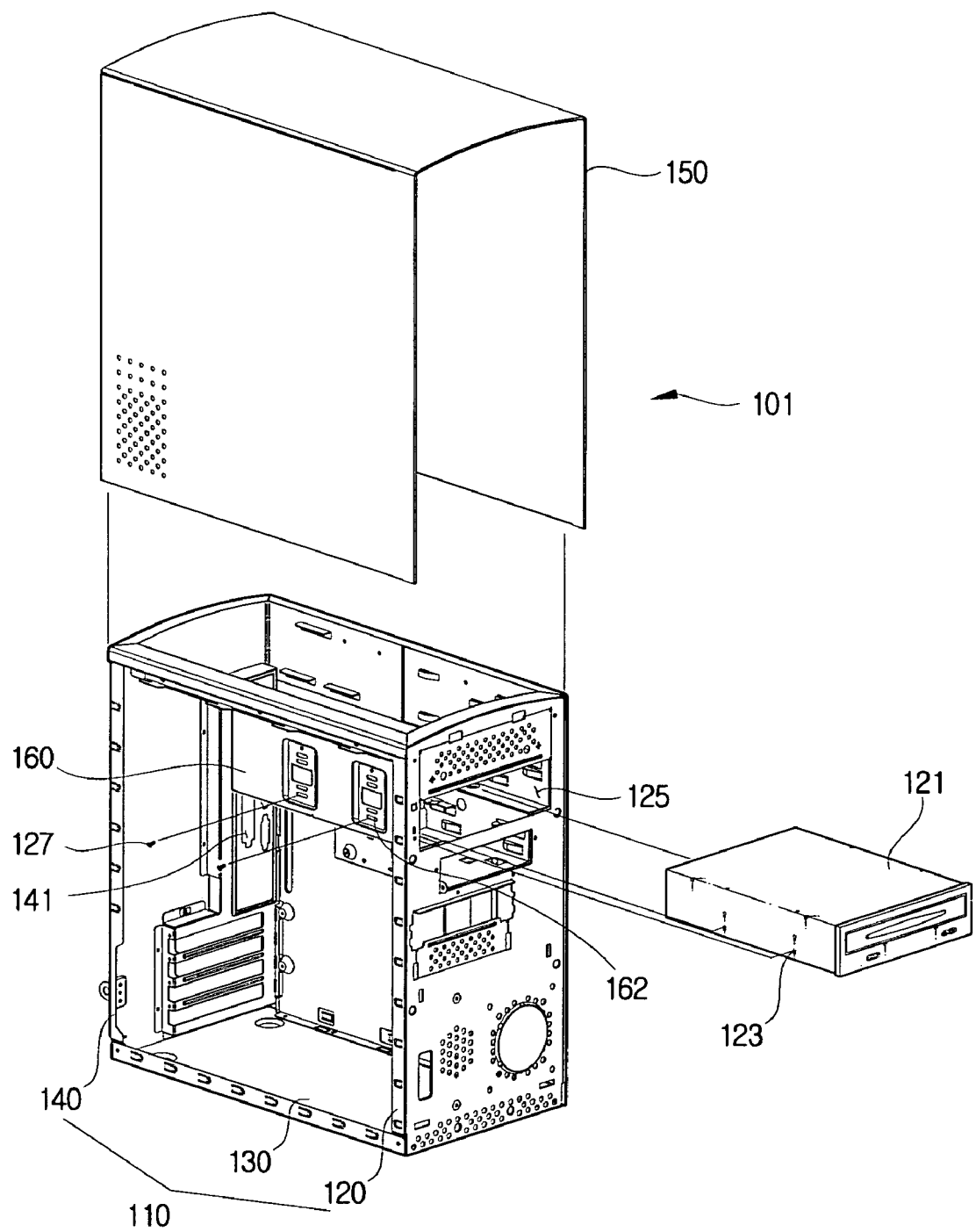
FIG. 7 is an exploded perspective view of a conventional computer.

As shown in FIGS. 4, 5 and 6, the lock comprises a locking groove 86 formed on a latch locking part 85 installed on a main body side surface 3 in the main body casing 2, and a latch member 40 installed on the bracket side 21 of the supporting bracket 20 by a latch hinge to enable the supporting bracket 20 to rotate between a locking position where the supporting bracket 20 is locked by the locking groove 86 and a unlocking position where the supporting bracket 20 is disengaged from the locking groove 86.

The latch member 40 is installed rotatably on one of the pair of bracket sides 21 of the supporting bracket 20. On a first side of the latch member 40, a gripping part 42 is provided to enable the user to manipulate rotation of the optical disk drive assembly 10 between the locking position and the unlocking position of the latch member 40. In particular, a locking part 43 locks or unlocks the supporting bracket 20 on the locking groove 86 according to manipulation of the gripping part 42 on a second side of the latch member 40. Accordingly, when the optical disk drive assembly 10 is in the accommodated position, the rotation of the optical disk drive assembly 10 is stopped in the locking position of the latch member 40 where the locking part 43 is engaged with the locking groove 86. Meanwhile, the rotation of the optical disk drive assembly 10 is allowed in the unlocking position where the locking part 43 is disengaged from the locking groove 86 as the user grips the gripping part 42 and rotates the latch member 40 about the latch hinge. In this way, if the rotation of the optical disk drive assembly 10 is allowed, the optical disk drive assembly 10 can rotate from the accommodated position to the ejected position.

Also, as shown in FIGS. 4, 5 and 6, a first shaft accommodating hole 41 accommodating rotatably a shaft 44 of the latch hinge is formed to pass through an area between the gripping part 42 and the locking part 43.

The latch member 40 is installed on the bracket side 21 of the supporting bracket 20 to enable the latch member 40 to rotate between the locking position and the unlocking position.

The latch hinge comprises a pair of shaft installing parts 24 protruding on the bracket side 21 of the supporting bracket 20 and being spaced from each other by a predetermined space, a second shaft accommodating hole 25 formed on each of the pair of shaft installing parts 24 to be positioned on a same axis line with the first shaft accommodating hole 41 of the latch member 40, the shaft 44 accommodated rotatably into each of the first and second shaft accommodating holes 41 and 25 with a ring member 46, and a twisting coil spring 45 that is a spring member coupled to the shaft 44 and configured for moving the latch member 40 in the unlocking position to the locking position elastically.

A damper functions to decrease a rotation speed of the optical disk drive assembly 10 to reduce impact on the main body casing 2 caused by a rapid rotation of the optical disk drive assembly 10 as the optical disk drive assembly 10 rotates from the ejected position to the accommodated position.

With reference to FIGS. 4, 5 and 6, The damper comprises a damper member 50 installed on the bracket bottom surface 22 of the supporting bracket 20, and a damper member guide 60 installed on the main body side plate 3 of the main body casing 2.

The damper member 50 comprises a damper installing part 51 provided on a first side of the damper member 50 and coupled to the bracket bottom surface 22 of the supporting bracket 20, and a damper locking part 54 provided on a second side of the damper member 50. The damper locking part 54 moves slidingly along a curved part 61 of the damper member guide 60 as the optical disk drive assembly 10 rotates from the ejected position to the accommodated position and is engaged with the curved part 61 in the accommodated position of the optical disk drive assembly 10.

Herein, the damper installing part 51 is formed with a through hole 52 positioned on a same axis line with a first boss 26 formed on the bracket bottom surface 22 of the supporting bracket 20 and combined by a third screw 53.

The damper member guide 60 made of plastic material has a triangular section and functions to guide the damper member 50 as the optical disk drive assembly 10 rotates from the ejected position to the accommodated position.

The damper member guide 60 is installed on the main body side plate 3 of the main body casing 2 by a damper combiner. A sloped side of the damper member guide 60 is formed with the curved part 61 having a ripple-like section to enable the damper locking part 54 of the damper member 50 to move slidingly as the optical disk drive assembly 10 rotates centering the hinge from the ejected position to the accommodated position.

With continued references to FIGS. 4, 5 and 6, the damper combiner comprises a combining hole 63 formed through a protrusion 62 provided on a first side of bottom area of the damper member guide 60, a second boss 87 formed on the main body side plate 3 of the main body casing 2 to be positioned on a same axis line with the combining hole 63 of the damper member guide 60, a fourth screw 65 combining the combining hole 63 and the second boss 87, a locking protrusion 64 formed on a second side of the bottom area of the damper member guide 60, and a locking holder 88 formed on the main body side plate 3 of the main body casing 2 for engaging with the locking protrusion 64 of the damper member guide 60.

Hereinbelow, an assembling method of the computer according to the embodiment of the present invention will be described. An assembling order described here is provided for illustrative purposes only, and it does not exclude different assembling orders.

The first installing holes 12 of the optical disk drive main body 11 and the second installing holes 23 of the supporting bracket 20 are combined with corresponding first screws 13 such that the optical disk drive main body 11 is accommodated into the supporting bracket 20. In this way, assembling of the optical disk drive assembly 10 is finished by combining the optical disk drive main body 11 to the supporting bracket 20.

Also, the latch member 40 is coupled to the bracket side 21 of the supporting bracket 20 with the twisting coil spring 45 provided between the bracket side 21 of the supporting bracket 20 and the latch member 40 to enable the latch member 40 to rotate elastically from the unlocking position to the locking position. Herein, the latch member 40 can rotate about the shaft 44 between the locking position and the unlocking position as the shaft 44 is inserted into the first shaft accommodating hole 41 of the latch member 40 and the second shaft accommodating holes 25 such that the latch member 40 is provided between the pair of shaft installing parts 24.

Secondly, the damper member 50 can be installed on the bracket bottom surface 22 of the supporting bracket 20 by inserting the third screw 53 into the first boss 26 of the bracket bottom surface 22 of the supporting bracket 20 and the through hole 52 of the damper installing part 51.

Meanwhile, the damper member guide 60 being engaged with the damper member 50 is installed on the main body side plate 3 of the main body casing 2. Herein, the installation of the damper member guide 60 is accomplished by combining the locking protrusion 64 of the damper member guide 60 to the locking holder 88 formed on the main body side plate 3 of the main body casing 2, and by inserting the fourth screw 65 into the combining hole 63 formed on the protrusion 62 of the damper member guide 60 and the second boss 87 formed on the main body side plate 3 of the main body casing 2.

Lastly, the completely-assembled optical disk drive assembly 10 is installed rotatably on the main body casing 2. Herein, the installation of the optical disk drive assembly 10 is accomplished by accommodating rotatably the hinge pin 73 into the hinge pin hole 72 of the hinge bracket installing part 71 having the combining part 74 installed on the main body casing 2 by the second screw 76 and into the second bracket hinge pin hole 31 of the optical disk drive assembly 10, and by inserting the hinge protrusion 29 formed on the first bracket hinge installing part 28 of the optical disk drive assembly 10 into the first and second main body hinge holes 82 and 84.

Hereinbelow, in the completely-assembled computer according to the embodiment of the present invention, an operating method of rotating the optical disk drive relative to the main body casing 2 between a first position and a second position will be described in a case that a user disassembles/assembles components to repair or upgrade the components in the main body casing 2 by referring to FIGS. 3, 5 and 6.

Firstly, as shown in FIG. 5, an initial state corresponds to when the optical disk drive assembly 10 is accommodated in the main body casing 2, and the locking part 43 of the latch member 40 is locked by the locking groove 86 of the latch locking part 85, and the damper locking part 54 of the damper member 50 installed on the bracket bottom surface 22 of the supporting bracket 20 is locked by the curved part 61 formed on the damper member guide 60 of the main body casing 2. In other words, the initial state is when the optical disk drive assembly 10 is in the accommodated position and the latch member 40 is in the locking position.

As an example, when the user wants to replace a memory device positioned behind the optical disk drive assembly 10 and installed on a main board 9, or to install another memory device additionally on the main board 9, as shown in FIG. 5, the user rotates the latch member 40 about the shaft 44 to the unlocking position by gripping and pulling the gripping part 42 of the latch member 40. Accordingly, as the twisting coil spring 45 between the latch member 40 and the bracket side 21 of the supporting bracket 20 is constricted elastically, engagement between the locking part 43 of the latch member 40 and the locking groove 86 of the latch locking part 85 is released. If the optical disk drive assembly 10 is unlocked from the main body casing 2, the rotation of the optical disk drive assembly 10 is allowed and the user can move the optical disk drive assembly 10 in a vertical direction about the hinge from the accommodated position. Herein, the damper locking part 54 of the damper member 50 moves slidingly along the curved part 61 of the damper member guide 60. Also, if the user removes a pressing force on the gripping part 42, as shown in FIG. 6, the latch member 40 constricted elastically in the unlocking position rotates elastically about the shaft 44 to the locking position.

In this way, if the optical disk drive assembly 10 is rotated about the hinge from the accommodated position toward the ejected position, as shown in FIGS. 3 and 6, the optical disk driver assembly 10 is ejected from the inside of the main body casing 2 and is positioned on the outside of the main body casing 2. In other words, the optical disk drive assembly 10 reaches the ejected position.

As described, if the optical disk drive assembly 10 reaches the ejected position, the optical disk drive assembly 10 leaves as much space in the inside of the main body casing 2 as it took in the accommodated position. Accordingly, the user can replace the memory device or install the additional memory device on the main board 9 easily with the space provided by rotating the optical disk drive assembly 10 out of the main body casing 10.

Meanwhile, if the user wants to accommodate the optical disk drive assembly 10 into the main body casing 2 by rotating the optical disk drive assembly 10 from the ejected position to the accommodated position after finishing repairing, replacing, or upgrading the components, the user grips the optical disk drive assembly 10 and rotates the optical disk drive assembly 10 downward into the main body casing 2 about the hinge.

Herein, if the damper locking part 54 of the damper member 50 affixed to the bracket bottom surface 22 of the supporting bracket 20 contacts the curved part 61 of the damper member guide 60 of the main body casing 2 as the optical disk drive assembly 10 rotates from the ejected position to the accommodated position, the damper locking part 54 begins to move slidingly along the curved part 61 of the damper member guide 60 with the rotation speed decreasing.

Finally, when the damper locking part 54 of the damper member 50 is locked by a bottom part of the curved part 61 of the damper member guide 60, if the user slightly applies the pressing force, as shown in FIG. 5, the locking part 43 of the latch member 40 is locked by the locking groove 86 of the latch locking part 85 installed on the main body casing 2. Accordingly, the optical disk drive assembly 10 does not rotate unless the user grips the gripping part 42 of the latch member 40 and manipulates to unlock the locking part 43 from the locking groove 86.

As described above, according to the embodiment of the present invention, the user can assemble or disassemble the components easily when repairing and upgrading the components, because the optical disk drive assembly 10 is ejected to the outside of the main body casing 2 by rotating the optical disk drive assembly 10, not like a conventional computer requiring the user to disassemble the optical disk drive assembly 10 from the main body casing 2 by disassembling a screw to disassemble components for repairing or upgrading of the components. Accordingly, convenience for the user can be enhanced as disassembling and assembling of other components for repairing or upgrading are simplified.

As described above, the embodiment of the present invention provides a computer that is easy for disassembling and assembling when the user repairs or upgrades because an optical disk drive assembly rotates between the accommodated position and the ejected position.

Although a few embodiments of the present invention have been shown and described, it will be appreciated by those skilled in the art that changes may be made in these embodiments without departing from the principles and spirit of the invention, the scope of which is defined in the appended claims.

What is claimed is:

1. A computer comprising:
a main body casing accommodating a plurality of hardware components and having an entrance opening on a first side thereof;
an optical disk drive assembly coupled to the main body casing to rotate relative to the main body casing;
a hinge unit provided on a side of the entrance opening of the main body casing, and supporting the optical disk drive assembly to enable the optical disk drive assembly to rotate between an accommodated position where the optical disk drive assembly is accommodated in the main body casing and an ejected position where the optical disk drive assembly is ejected out of the main body casing through the entrance opening; and
a damper decreasing a rotation speed of the optical disk drive assembly when the optical disk drive assembly rotates from the ejected position to the accommodated position;
wherein the damper comprises:
a damper member provided on one of the optical disk drive assembly and the main body casing, and having a damper locking part; and
a damper member guide provided on the other one of the optical disk drive assembly and the main body casing, and guiding the damper member with a curved part on which the damper locking part moves slidingly as the optical disk drive assembly rotates from the ejected position to the accommodated position.

2. The computer according to claim 1, wherein the hinge unit comprises first and second hinges being spaced from each other with a predetermined distance along a longitudinal direction on the side of the entrance opening.

3. The computer according to claim 1, further comprising a lock for locking or unlocking the optical disk drive assembly relative to the main body casing in the accommodated position.

4. The computer according to claim 3, wherein the lock comprises:
   a locking holder provided on one of the main body casing and the optical disk drive assembly; and
   a latch member provided on the other one of the main body casing and the optical disk drive assembly, comprising a locking part capable of engaging with the locking holder, and rotating between a locking position where the locking part stops rotation of the optical disk drive assembly by being engaged with the locking holder and an unlocking position where the rotation of the optical disk drive assembly is allowed as the locking part is disengaged from the locking holder.

5. The computer according to claim 4, wherein the optical disk drive assembly comprises:
   an optical disk drive main body being capable of accommodating an optical disk; and
   a supporting bracket supporting the optical disk drive main body.

6. The computer according to claim 1, wherein the optical disk drive assembly comprises an optical disk drive main body being capable of accommodating an optical disk, and a supporting bracket supporting the optical disk drive main body, the damper member is installed on the bottom surface of the supporting bracket, and the damper member guide is installed on the side of the main body casing opposite to the entrance opening.

7. A computer comprising:
   a main body casing accommodating a plurality of hardware components and having an entrance opening on a first side thereof;
   an optical disk drive assembly coupled to the main body casing to rotate relative to the main body casing, the optical disk drive assembly including a supporting bracket;
   a hinge unit provided on a side of the entrance opening of the main body casing, and supporting the optical disk drive assembly to enable the optical disk drive assembly to rotate between an accommodated position where the optical disk drive assembly is accommodated in the main body casing and an ejected position where the optical disk drive assembly is ejected out of the main body casing through the entrance opening;
   wherein the hinge unit comprises first and second hinges being spaced from each other with a predetermined distance along a longitudinal direction on the side of the entrance opening, the first hinge comprising:
   a hinge protrusion formed on a bottom surface of the supporting bracket; and
   a pair of main body hinge holes provided on the side of the entrance opening of the main body casing, and rotatably accommodating the hinge protrusion.

8. The computer according to claim 7, wherein the hinge unit comprises first and second hinges being spaced from each other with a predetermined distance along a longitudinal direction on the side of the entrance opening, the second hinge comprising:
   a hinge bracket connecting the main body casing and the supporting bracket;
   a hinge pin hole formed through the hinge bracket and the supporting bracket; and
   a hinge pin rotatably accommodated into the hinge pin hole.

9. A computer comprising:
   a main body casing accommodating a plurality of hardware components and having an entrance opening on a first side thereof;
   an optical disk drive assembly coupled to the main body casing to rotate relative to the main body casing, the optical disk drive assembly including a supporting bracket; and
   a hinge unit provided on a side of the entrance opening of the main body casing, and supporting the optical disk drive assembly to enable the optical disk drive assembly to rotate between an accommodated position where the optical disk drive assembly is accommodated in the main body casing and an ejected position where the optical disk drive assembly is ejected out of the main body casing through the entrance opening; and
   a lock for locking or unlocking the optical disk drive assembly relative to the main body casing in the accommodated position;
   wherein the lock comprises:
   a locking holder provided on one of the main body casing and the optical disk drive assembly; and
   a latch member provided on the other one of the main body casing and the optical disk drive assembly, comprising a locking part capable of engaging with the locking holder, and rotating between a locking position where the locking part stops rotation of the optical disk drive assembly by being engaged with the locking holder and an unlocking position where the rotation of the optical disk drive assembly is allowed as the locking part is disengaged from the locking holder;
   wherein the latch member is installed on a side of the supporting bracket; and
   wherein the locking holder comprises a locking groove formed through the latch locking part installed on a side of the main body casing opposite to the entrance opening.

10. The computer according to claim 9, wherein the latch member further comprises a latch hinge supporting the latch member to enable the latch member to rotate between the locking position and the unlocking position; and
   wherein the latch hinge comprises a shaft accommodating hole formed through the latch member and the supporting bracket, a shaft rotatably accommodated into the shaft accommodating hole, and a spring member coupled to the shaft.

* * * * *